US008653691B2

(12) United States Patent
Hsu et al.

(10) Patent No.: US 8,653,691 B2
(45) Date of Patent: Feb. 18, 2014

(54) DUAL BIPOLAR MAGNETIC FIELD FOR LINEAR HIGH-VOLTAGE CONTACTOR IN AUTOMOTIVE LITHIUM-ION BATTERY SYSTEMS

(75) Inventors: Chih-Cheng Hsu, Rochester Hills, MI (US); Andrew J. Namou, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 515 days.

(21) Appl. No.: 13/076,636

(22) Filed: Mar. 31, 2011

(65) Prior Publication Data

US 2012/0181860 A1 Jul. 19, 2012

Related U.S. Application Data

(60) Provisional application No. 61/432,329, filed on Jan. 13, 2011.

(51) Int. Cl.
*B60L 3/00* (2006.01)
*H01H 47/00* (2006.01)

(52) U.S. Cl.
USPC ........................... 307/10.1; 335/125; 361/143

(58) Field of Classification Search
USPC ........................... 307/10.1; 361/143; 335/125
See application file for complete search history.

(56) References Cited

U.S. PATENT DOCUMENTS

| | | | | |
|---|---|---|---|---|
| 4,250,364 A * | 2/1981 | Kimblin et al. | ............... | 218/141 |
| 4,319,296 A * | 3/1982 | Kimblin et al. | ................... | 361/4 |
| 6,700,466 B1 | 3/2004 | Yamamoto et al. | | |
| 2011/0032059 A1 | 2/2011 | Ito et al. | | |

FOREIGN PATENT DOCUMENTS

| | | |
|---|---|---|
| JP | 2001118450 A | 4/2001 |
| JP | 2001176370 A | 6/2001 |
| JP | 2003272499 A | 9/2003 |
| WO | 2009116493 A1 | 9/2009 |

* cited by examiner

*Primary Examiner* — Hal Kaplan

(74) *Attorney, Agent, or Firm* — Dinsmore & Shohl LLP

(57) ABSTRACT

A device and method for operating automotive battery system relays and related switches. By creating a dual bipolar magnetic field adjacent the contactor portion of a switching mechanism in the relay, the magnetic field used to promote arc extinguishing is shifted, which in turn reduces the Lorentz force that forms as a byproduct of the field. Such a configuration has the potential for simultaneously maintaining arc-extinguishing capability and improving short-circuit withstanding capability while reducing the tendency of the Lorentz forces to interfere with the operation of a solenoid or other switch-activating mechanisms. Such devices and methods may be used in conjunction with hybrid-powered and electric-powered vehicles.

16 Claims, 7 Drawing Sheets

DUAL BIPOLAR MAGNETIC FIELD FOR LINEAR HIGH-VOLTAGE CONTACTOR IN AUTOMOTIVE LITHIUM-ION BATTERY SYSTEMS

This application claims the benefit of the filing date of U.S. Provisional Application No. 61/432,329, filed Jan. 13, 2011.

BACKGROUND OF THE INVENTION

This invention relates generally to a device and method to reduce the magnitude of a Lorentz force formed on solenoid-based linear contact plate, and more particularly to a device and method to reduce such magnitude while maintaining arc-extinguish features when the contact plate is opened or otherwise de-energized.

Solenoids are often used to open and close relays, switches and related electrical circuit contacts. Typically, a high-voltage contactor employs the solenoid to move a contact plate into selective connection with a pair of stationary current-carrying terminals to complete an electrical circuit between the terminals. The circuit is open (i.e., incomplete) when the solenoid is de-energized, and closed (i.e., complete) when the solenoid is energized. The presence of high voltage and current in the circuit can cause arcing between the contact plate and the terminals in the time immediately after contact is broken. Such arcing is not desirable, especially in high current modes of operation, as the power created by the arc tends to get absorbed by (or otherwise acts upon) nearby components that may not be electrically hardened.

Attempts to reduce or extinguish the arc have included enclosing the contact plate and terminals inside a chamber filled with a dielectric gas that introduces arc-inhibiting features by absorbing some of the energy during the arc formation. Such a configuration also reduces the packaging and provides some level of environment-independent usage. Despite this, such a solution is not preferred due to the increase in device cost and complexity.

In another attempt, supplemental magnet pairs have been placed on opposing sides of the contact plate and terminals to take advantage of the Lorentz force that acts upon the terminals or other current-carrying members that are exposed to the magnetic field. The inherent Lorentz force can be used in the instant immediately after the circuit is opened at the contact plate to accelerate arc elimination by taking advantage of the arc's polarity to stretch it over a larger region. Such an approach is generally satisfactory for helping to extinguish the arc. Unfortunately, the Lorentz force produced by the supplemental magnets is also imparted onto the nearby contact plate during normal closed-circuit operation. Because this force (which by virtue of the orientation of the magnets relative to the current flowing through the contact plate is generally in a direction that could promote premature separation of the contact plate from the terminals) can interfere with the operation of the solenoid in general and the contact plate in specific, there remain ways in which solenoid operation may be improved.

In yet another attempt, a spring used to close the high-voltage contactor can be designed to have a larger spring rate to keep the contact closed during a high-current (or short circuit fault) situation. Such an enhanced spring force may have a tendency to resist premature contact plate opening from the supplemental magnet Lorentz forces discussed above; unfortunately, the stronger spring will necessitate a higher-force solenoid to open the contact. This in turn requires more energy, such as through a larger coil. Such a solution is not preferred due to the concomitant increase in weight, volume, electrical energy usage and cost.

Automotive lithium-ion batteries are being used to provide partial (in the case of hybrid system) or total (in the case of all-electric system) motive power. Significant levels of one or both voltage and current are needed to provide electrical power to a motor that in turn can provide propulsive power to a set of wheels. The high levels of electrical power employed by such battery systems could, if left uncorrected, lead to significant arcing during relay and related switch operation. In systems that employ some form of magnet-based arc-extinguishing (such as that discussed above), Lorentz forces induced by the magnetic fields are large enough to interfere with the plates and contacts of conventional relay and related switch assemblies by moving them to a different degree (or at a different time) than that for which they were designed. In particular, this downwardly-directed force may overcome the bias established by the induced magnetic force on the solenoid's plunger, which could cause inadvertent open contacts and the very arcing that the supplemental magnets were included to avoid. This untimely contact plate opening may have deleterious effects on the operation of a battery-powered automotive propulsion system.

SUMMARY OF THE INVENTION

The supplemental magnets used for a relay, switch or related solenoid-based device can be formed to set up a dual bipolar magnetic field in order to reduce the arcing associated with de-energized contacts while simultaneously reducing the tendency of the formed Lorentz forces to impact operation of the electric terminals and contact plate. This dual bipolar configuration, which is formed as a result of two separate magnetic fields created by the sets of magnet pairs, is established in a region adjacent a contactor portion of the relay. This separation of the fields shifts the concentrations of the magnetic density toward a region formed along a side of a chamber that encloses the contact plate and terminals that make up the contactor portion. As a result, the magnetic density is imparted to a smaller contact plate surface area in general, and in particular drastically decreased at the center of the contactor portion. By keeping the amount of contact plate surface area that is exposed to the magnetic field as small as possible, the amount of Lorentz force imparted to the plate is concomitantly kept low, which in turn lessens the chance of an inadvertent separation of the contact plate and the terminals due to such force. The present dual bipolar design also helps maintain control of arc-extinction to improve the stability of the high-voltage contactors, which in turn leads to more robust relay design for high-voltage contactors such as those encountered in lithium-ion battery systems. By separating the magnets and placing them at the four corners around the contactor portion of the relay or switch, the bipolar design formed thereby can significantly decrease the physical effects that are introduced during extreme conditions, such as short-circuit faults.

According to a first aspect of the invention, a switching assembly is disclosed. In the present context, a switching assembly corresponds to an arrangement of components that together allow for selective opening and closing of an electric circuit. As such, electric current passing through the switching circuit can be used to switch on or off a secondary electric circuit. In one example, such a secondary circuit could be a work-performing circuit configured to deliver electric current from one or more batteries (such as a lithium-ion battery) to an electric motor or other devices that can provide propulsive power for a car, truck or related vehicular or motive application. In particular form, the switching assembly of the present invention may be configured as a relay, switch or related circuit-opening and circuit-closing mechanism. The switching assembly includes a solenoid with a plunger that is movably responsive to electric current that passes through the solenoid's coil. In general, the plunger experiences translational movement (for example, up and down or sideways, depending on the orientation of the solenoid) upon energizing and de-energizing the coil. The assembly additionally includes a contact plate that is able to convey an electric current and can be moved by the plunger. While one preferred embodiment has the plunger and the contact plate in direct contact with one another, such direct contact is not necessary, as there may be intervening structure that does not detract from the force imparted to the contact plate from the plunger. The assembly additionally includes two or more terminals that are placed apart from one another such that upon contact of the terminals by the moving contact plate, an electric circuit connected to the two terminals may be completed. An example of such an electric circuit is any circuit that can be used to convey current capable of performing work such as that discussed above for supplying electricity from a lithium-ion powerplant to a motor or set of wheels for an automotive application. When the solenoid is energized, the plunger forces the contact plate into contact with each of the terminals to complete the circuit between them.

The assembly further includes numerous arc-extinguishing magnets. These magnets (also referred to herein as supplemental magnets) are placed about a region defined at least by the contact plate and the portion of the terminals that cooperate with the contact plate. This way, a contact point established by such cooperation is exposed to a reduced magnetic field. Specifically, the magnets are arranged such that something less than the totality of the contact plate is exposed to the field. By proper placement, sizing and segmentation of the field produced by the magnets, a portion of the field impinges predominantly on a first portion of the contact plate while a portion of the field impinges predominantly on a second portion of the contact plate that is spaced away from the first portion. By such construction, the Lorentz force (which is a byproduct of the magnetic field) imparted to the contact plate is less than if an entirety of the contact plate were exposed to the field, while still able to promote the arc-extinguishing features during the period immediately after the solenoid is de-energized and the contact between the contact plate and the terminals is broken.

In one form, the supplemental magnets are arranged as a dual bipolar set; such construction removes a portion of the Lorentz force from operation on (or coupling to) the contact plate. By reducing the size of the magnetic field that interacts with the contact plate, the magnitude of the Lorentz force (which is downwardly-directed in applications where the movement of the plunger is up and down and the contact plate is arranged above the plunger to also travel up and down) imparted to the contact plate is reduced. This in turn reduces the tendency of the contact plate to separate from the terminals prematurely. This dual bipolar set means that the portion of the field that impinges predominantly on the first portion is generated by a first set while the portion of the field that impinges predominantly on the second portion is generated by a second set. More particularly, the configuration is such that the magnetic field extends substantially orthogonal to a direction of movement of the plunger; in this way, the portion of the field that is generated by the first magnet set extends on one lateral side of the plunger while the portion of the magnetic field that is generated by the second magnet set extends on a substantially opposing lateral side of the plunger. Even more particularly, the two sets of magnets are arranged in a four-square pattern such that a portion of the field that is generated by a first magnet set extends to cover less that one half of the contact plate closest to a first of the terminals while a portion of the field that is generated by a second magnet set extends to cover less that one half of the contact plate closest to a second of the terminals. In another option, the terminals are made up of a first terminal and a second terminal, while the contact plate extends in an elongate direction between the first and second terminals such that the first portion of the contact plate is generally adjacent to the first terminal while a second portion of the contact plate is generally adjacent to the second terminal. More particularly, the contact plate is formed into an elongate shape such that the first portion does not overlap the second portion. By such construction of the contact plate and the magnet sets, a significant portion of the contact plate (in particular, in the region about its middle) has a substantially reduced exposure to the Lorentz force that is generated by the interaction of the magnetic fields and the current flow through the terminals and contact plate. Such construction also means that the imposed Lorentz force and the movement of the solenoid's plunger proceed along a generally parallel path.

According to another aspect of the invention, a vehicular propulsion system is disclosed. The system includes numerous batteries, a motive force and a switching assembly configured to permit selective delivery of an electric current from the batteries to the motive force. The switching assembly includes a solenoid comprising at least a coil and a plunger movably responsive to electric current flowing through the coil. In addition, the assembly includes a contact plate and at least two terminals configured to transmit electric current through the plate when in contact with one another. The terminals are cooperative with the solenoid and the contact plate such that upon the solenoid being energized, the plunger forces the contact plate into contact with the terminals to complete an electric circuit. The assembly additionally includes numerous arc-extinguishing magnets disposed about a region defined at least in part by the contact between the contact plate and the terminals such that a portion of a field created by the magnets impinges predominantly on a first portion of the contact plate while another portion of the field impinges predominantly on a second portion of the contact plate that is spaced away from the first portion. The number and placement of the magnets is such that the portions of the field impart a lower Lorentz force onto the contact plate than if an entirety of the contact plate were exposed to the field (such as in the situation where a N-S field formed by a magnet with dimensions that span the substantial entirety of the contact plate were present).

Optionally, the batteries are lithium-ion batteries. In another option, the motive force is made up of an electric motor that is rotationally coupled to one or more vehicular wheels. More particularly, a vehicular transmission may be disposed between the electric motor and the wheel or wheels in order to vary an amount of rotational power being generated by the electric motor electric motor to the wheel or wheels.

According to another aspect of the invention, a method of operating a switching assembly is disclosed. The method includes disposing a contact plate adjacent electrically-conductive terminals and operating a solenoid. When the solenoid is energized, it forces the contact plate into contact with the terminals to complete an electric circuit Likewise, when the solenoid is de-energized, it permits the contact plate to separate from the plurality of terminals to open (i.e., disable) the electric circuit. The switching assembly also includes numerous arc-extinguishing magnets disposed about a region defined at least in part by the contact points. In this way, a portion of a field created by the magnets impinges predominantly on a first portion of the contact plate while another portion of the field impinges predominantly on a second portion of the contact plate that is spaced away from the first portion such that the portions of the field impart a lower Lorentz force onto the contact plate than if an entirety of the contact plate were exposed to the field.

Optionally, the switching assembly comprises an automotive relay. More particularly, the electric circuit forms a portion of a power circuit that comprises a plurality of electric batteries and wiring configured to convey electric current from the plurality of electric batteries to a motive force through the relay. Even more particularly, the motive force comprises an electric motor that is rotationally coupled to at least one vehicular wheel. More particularly still, the plurality of batteries comprise a plurality of lithium-ion batteries. In one form, the solenoid and the contact plate are affixed to one another such that movement of a solenoid component (such as a plunger that moves in response to a field set up in the solenoid's coil) forces the contact plate toward or away from the terminals, depending on whether the solenoid is being energized or de-energized.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1A:
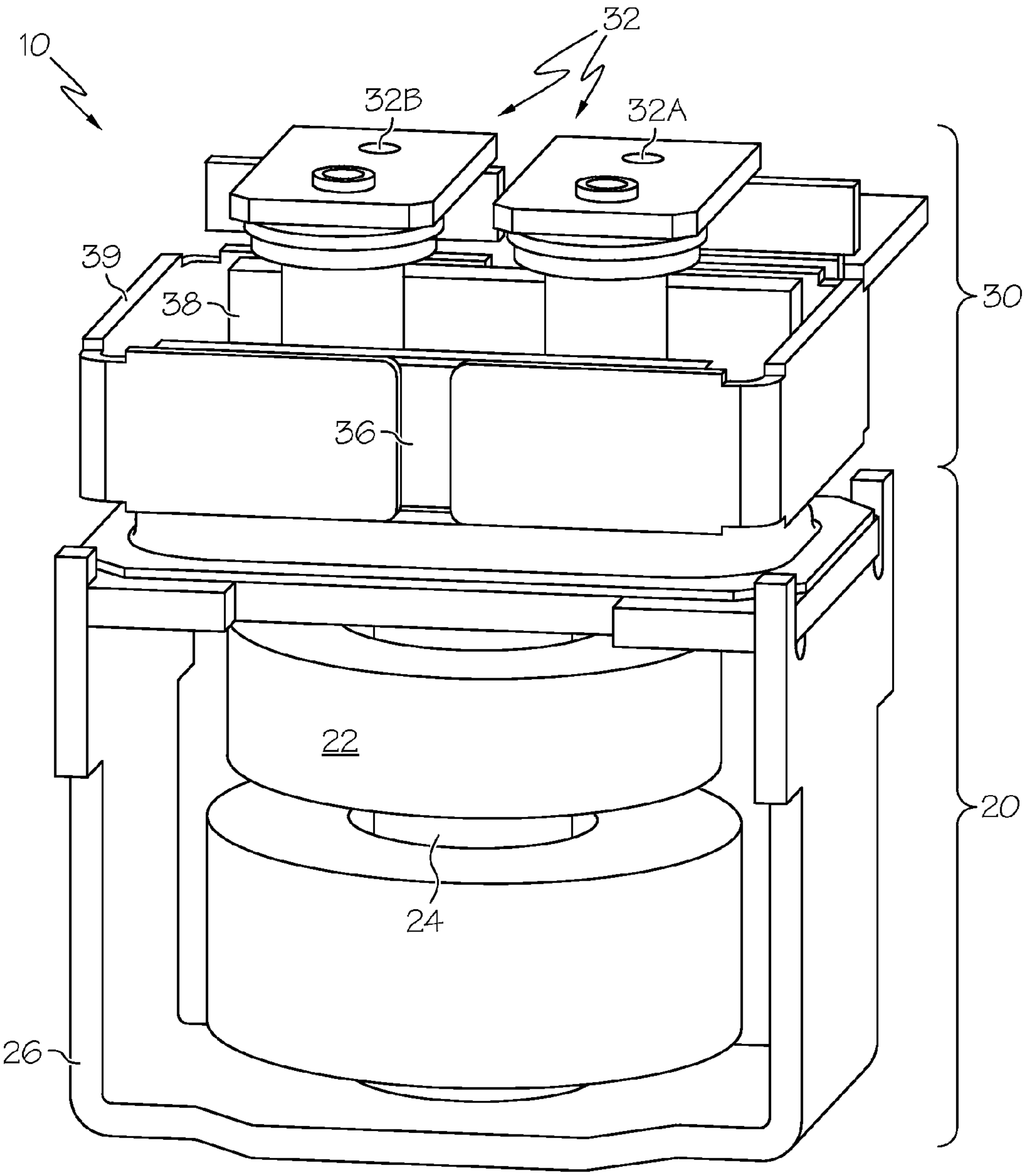
FIG. 1A (PRIOR ART)
FIG. 1A shows a simplified perspective view of a typical linear electrical relay according to the prior art.
Figure 1B:
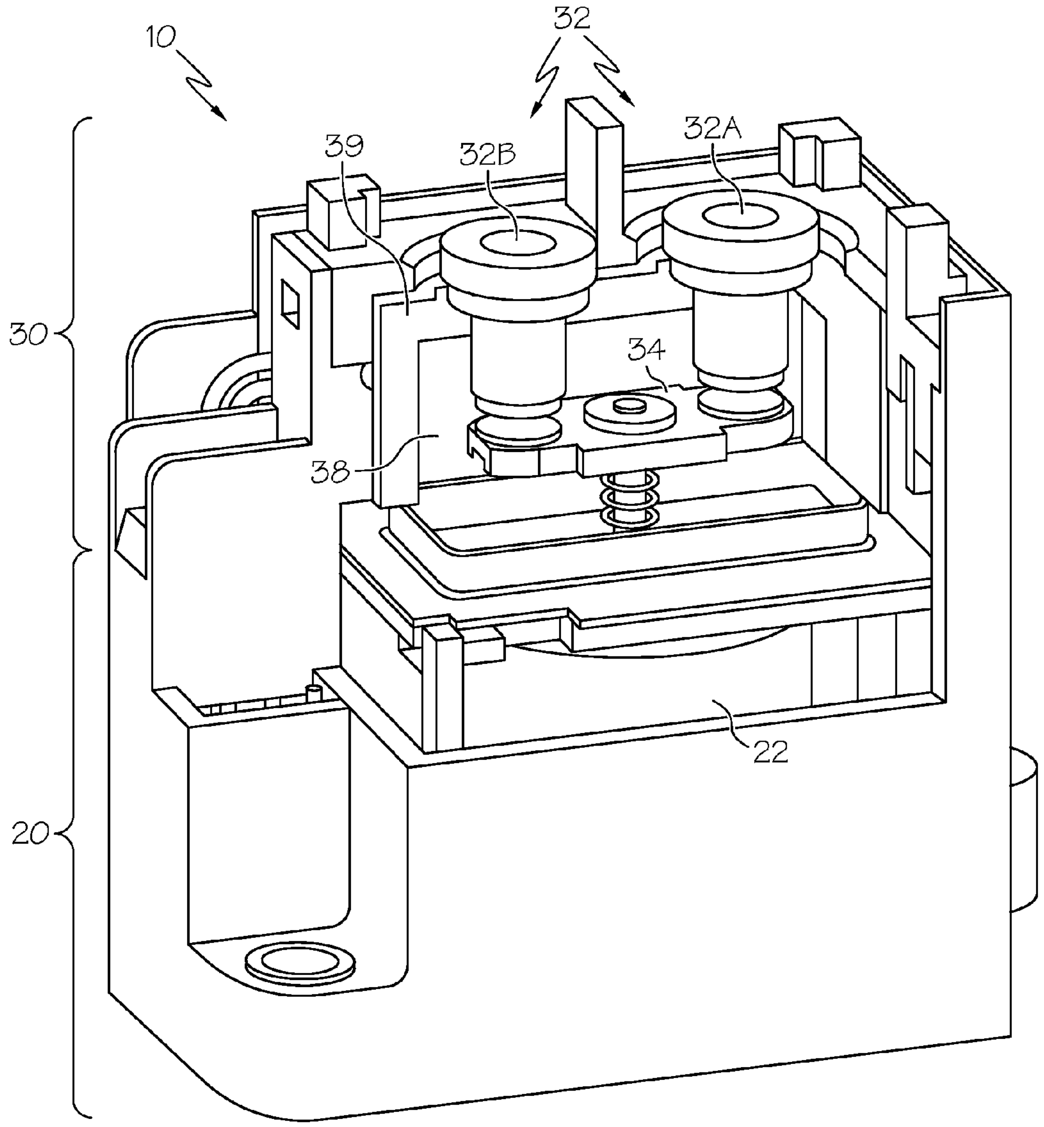
FIG. 1B (PRIOR ART)
FIG. 1B shows a partial cutaway view of the relay of FIG. 1A.

As discussed above, the effect of arcing on the opening contactor portion of a linear switching assembly (such as a relay) can have a deleterious effect on the assembly and adjacent components. Depending on the configuration of the switching assembly, as well as the voltage and current flowing through the circuit, such arcing occurs very promptly, often on the order of a few hundred microseconds. As mentioned above, prior art approaches have included placing magnets adjacent a contactor portion that includes the contact plates and terminals used to establish a high voltage contactor. Referring first to FIGS. 1A and 1B, a conventional relay 10 (which may also be in the form of a cutout, circuit breaker or related switch) is outfitted with arc-extinguishing magnets (discussed in more detail below). Relay 10 includes a solenoid portion 20 and a contactor portion 30. The solenoid portion 20 includes one or more coils 22 that, when energized, generate a magnetic flow that will longitudinally move an enclosed core, shaft or plunger 24 that is placed within the coil 22. The coil 22 and plunger 24 are enclosed within a magnetizable yolk or field 26 that acts to strengthen the magnetic flow. The contactor portion 30 is shown at the top and generally includes of a pair of terminals 32 (shown individually as 32A and 32B) and a moving-contact plate 34 that is connected to the top of plunger 24. The contact plate 34 selectively attaches and detaches from the terminals 32 depending on whether the solenoid portion 20 is energized or de-energized. Thus, when the coil 22 is energized, plunger 24 forces contact between the contact plate 34 and the terminals 32, allowing electric current to flow from one terminal to another. Likewise, when coil 22 is not energized, the plunger is retracted under spring biasing means back into the coil 22 such that the high voltage contactor will be in an open status.

Figure 2:
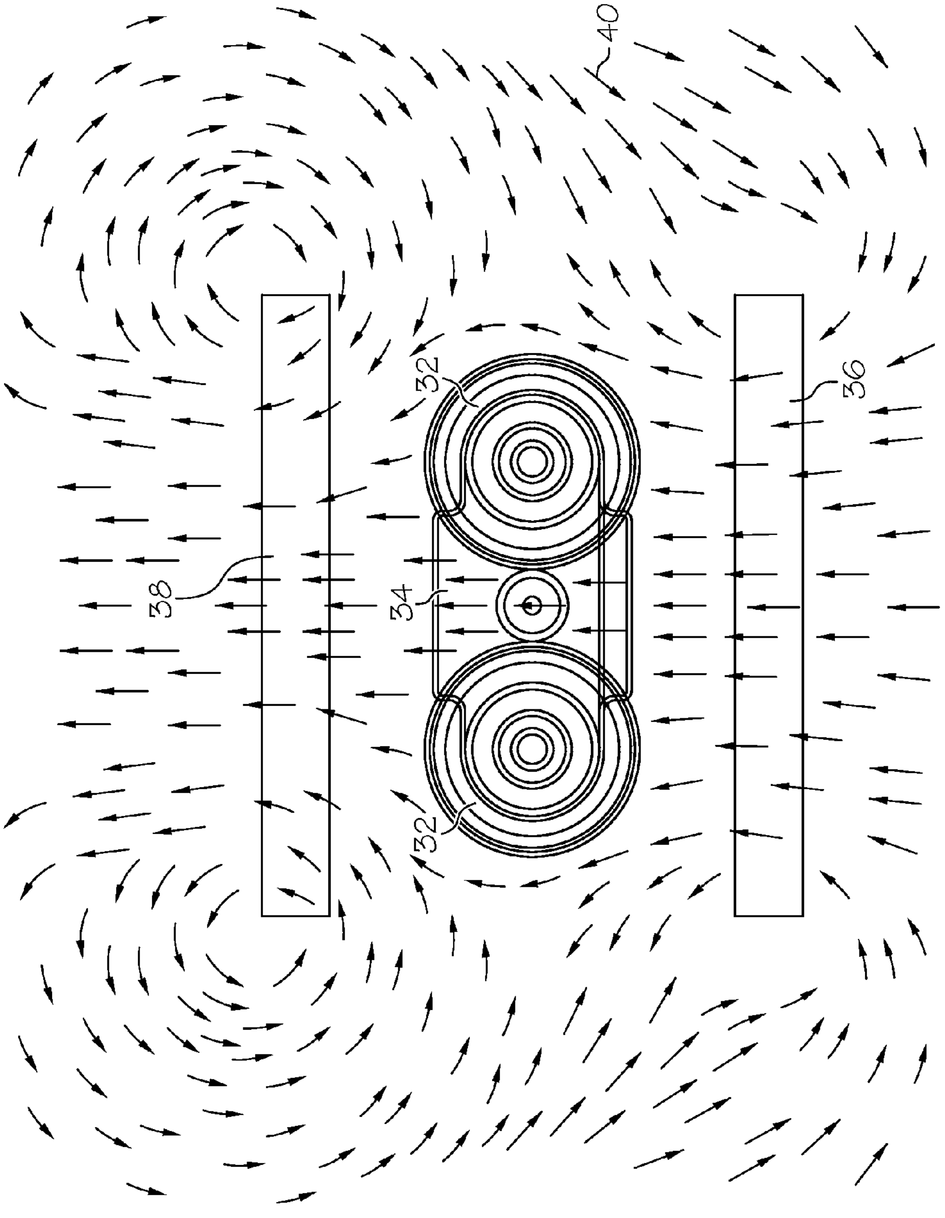
FIG. 2 (PRIOR ART)
FIG. 2 shows a top view of a representative magnetic field generated by magnets disposed about the contact plate and terminal region of the relay of FIGS. 1A and 1B.

Referring next to FIG. 2 in conjunction with FIGS. 1A and 1B, a pair of magnets 36 and 38 are placed astride the terminals 32 such that a magnetic field 40 engulfs contactor portion 30. In the version depicted in the figures, magnet 36 corresponds to a north pole, while magnet 38 corresponds to a south pole such that a N-S bipolar relationship exists between them, although it will be appreciated by those skilled in the art that an opposing polarity could be established. The pair of magnets 36 and 38 depicted in FIG. 1A are placed across the entire length of the contact area formed between the contact plate 34 and the terminals 32, and in fact extend laterally beyond to promote adequate magnetic field size. A frame 39 is used to securely mount the magnets 36 and 38 to the yoke 26, in addition to helping to define a region around the terminals 32 and contact plate 34 where the magnetic filed is most pronounced.

As is well-understood by those skilled in the art, the magnetic field 40 will force an arc that is produced upon separation of the terminals 32 and contact plate 34 to expand toward the outside of the surface of the contact area and the remainder of the region defined by the magnet 36 and 38 and the frame 39. While the arc expansion (and related energy dissipation) is beneficially sped up by the magnets, the magnets 36 and 38 also generate a Lorentz force on the contact plate 34. Under certain operating conditions (especially those associated with high-power sources, such as those used to propel an automobile or related vehicle), a higher-than-expected current may be encountered, causing the Lorentz force to become large enough to move the plate 34 downward to open the contact between it and the terminals 32.

Figure 3A:
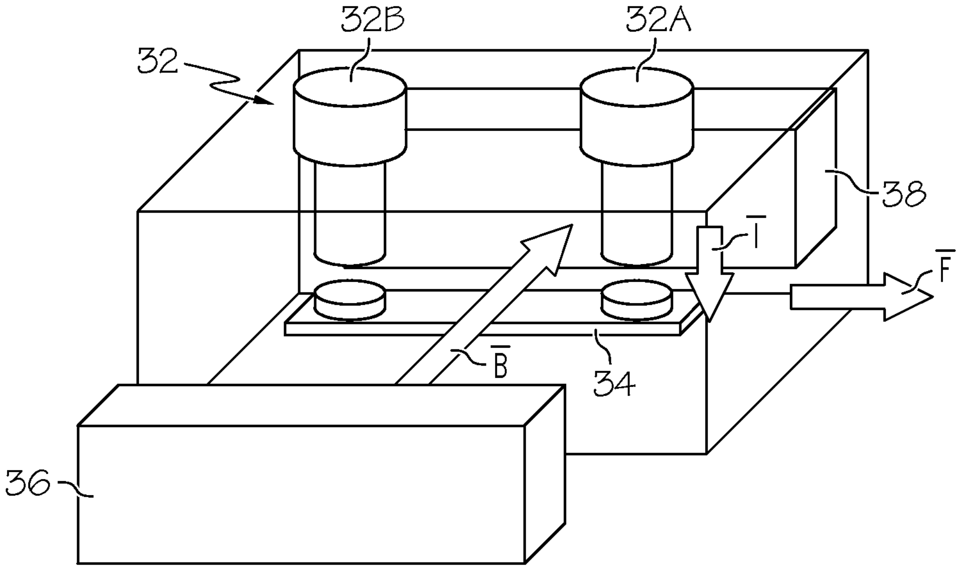
FIG. 3A shows how an outwardly-directed Lorentz force produced by the relationship between electric current and magnetic field can be used to suppress an arc formed during a period immediately after the circuit connected by a linear relay has been disrupted.
Figure 3B:
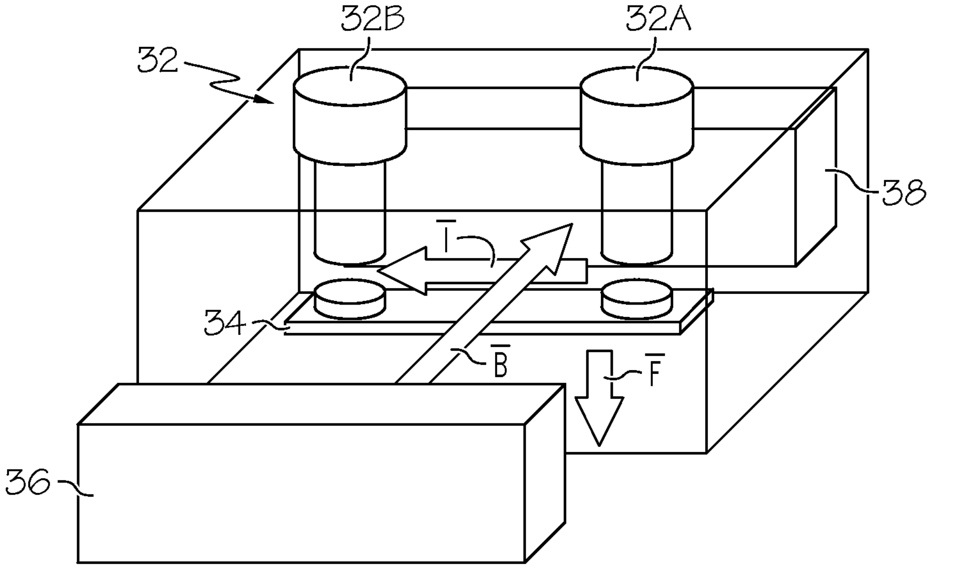
FIG. 3B shows how a Lorentz force produced by the relationship between electric current and magnetic field during normal circuit operation has a downwardly-directed component that may operate on a linear relay's contact plate.

Referring next to FIGS. 3A and 3B, by the construction of the relay 10 from FIGS. 1A and 1B, the direction of electric current flow through the contact plate is oriented such that it operates along a direction that is orthogonal to that of the magnetic field that extends between the north and south poles of each of the magnets 36 and 38. In this way, and keeping in mind that the force $\vec{F}$ generated is generally related to the interaction of the magnetic field $\vec{B}$ and the current $\vec{i}$ by the vector quantity $$\vec{F}=i\times\vec{B}$$

the resulting Lorentz force is directed in a direction that is substantially orthogonal to the plane of cooperation between the current $\vec{i}$ and magnetic field $\vec{B}$. This orthogonal interaction between the magnetic field formed by magnets 36 and 38, the current flow through rightmost terminal 32A and leftmost terminal 32B and the force imparted to the contact plate 34 in two separate circumstances is shown. In the first instance of FIG. 3A, which is immediately after the circuit has been opened (i.e., where the connection between the contact plate 34 and the terminals 32A and 32B has just been opened), because the residual current $\vec{i}$ is flowing downward in the rightmost terminal 32A and upward in the leftmost terminal 32B, the interaction with the magnetic field $\vec{B}$ produces a rightward force from the rightmost terminal 32A and a leftward force from the leftmost terminal 32B, thereby (in both cases) pushing the arc (not shown) outward such that its energy can dissipate more quickly. As such, this force tends to shorten the arcing duration, and is a generally desirable byproduct of the interaction of the electric current flowing through the terminals and the magnetic field passing between the magnets. In the second instance of FIG. 3B (which may coincide with a period of normal circuit operation up to and including the period just before the circuit is opened), the Lorentz force $\vec{F}$ is shown acting on the contact plate 34 on which the current $\vec{i}$ flows in the right-to-left direction and the magnetic field $\vec{B}$ is as before. The resulting force $\vec{F}$ will be in the downward direction, which could undesirably operate upon the contact plate 34 by forcing it to open prematurely. It is this situation that the present inventors have determined should be avoided, at least for circumstances where there is linear coupling between the terminals and the contact plate.

Figure 4A:
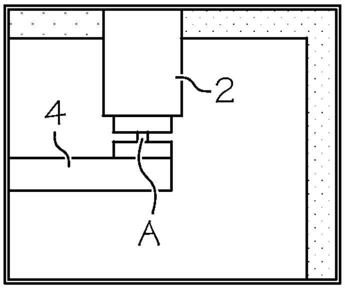
FIGS. 4A through 4E show the formation and growth and subsequent extinguishing of an arc during a time sequence after high voltage electrical contact of a linear electric relay has been disrupted.
Figure 4B:
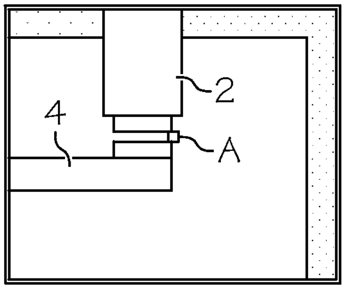
Figure 4C:
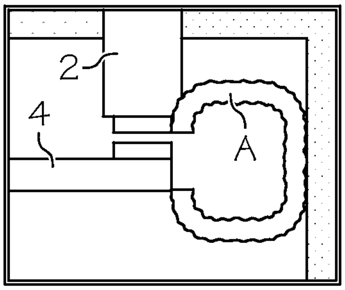
Figure 4D:
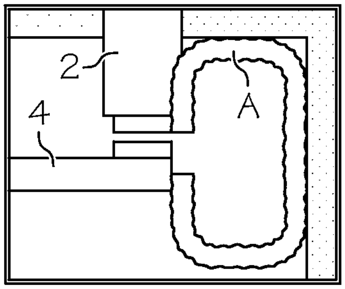
Figure 4E:
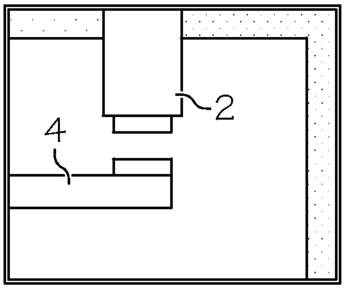

Referring next to FIGS. 4A through 4E, the mechanisms behind arcing formation are shown in sequence. In FIG. 4A, the arc A starts at the gap that is formed as the terminal 32 pulls away from the contact plate 34. FIG. 4B shows that the arc A shifts outward under the influence of the magnetic field $\vec{B}$ that is created by the magnets 36 and 38 of FIGS. 3A and 3B. FIG. 4C shows that the arc is expanding once the arcing voltage is increased, while FIG. 4D shows the effect of the ambient atmosphere on the arc, as the cooling effect of the atmosphere causes the voltage to further increase. Lastly, FIG. 4E shows that when the arcing voltage is equal to or greater than the voltage between contacts, the arc will be extinguished.

Figure 5:
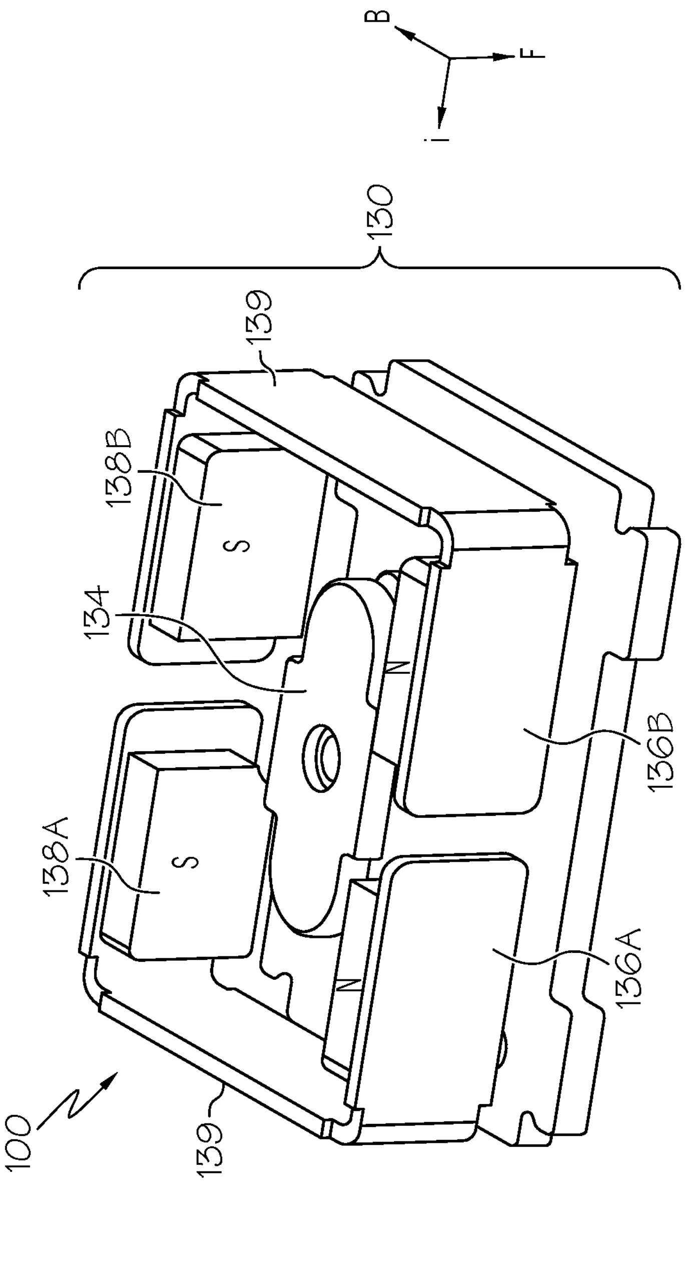
FIG. 5 shows a simplified perspective view of a contactor portion of a linear electrical relay according to an aspect of the present invention.
Figure 6:
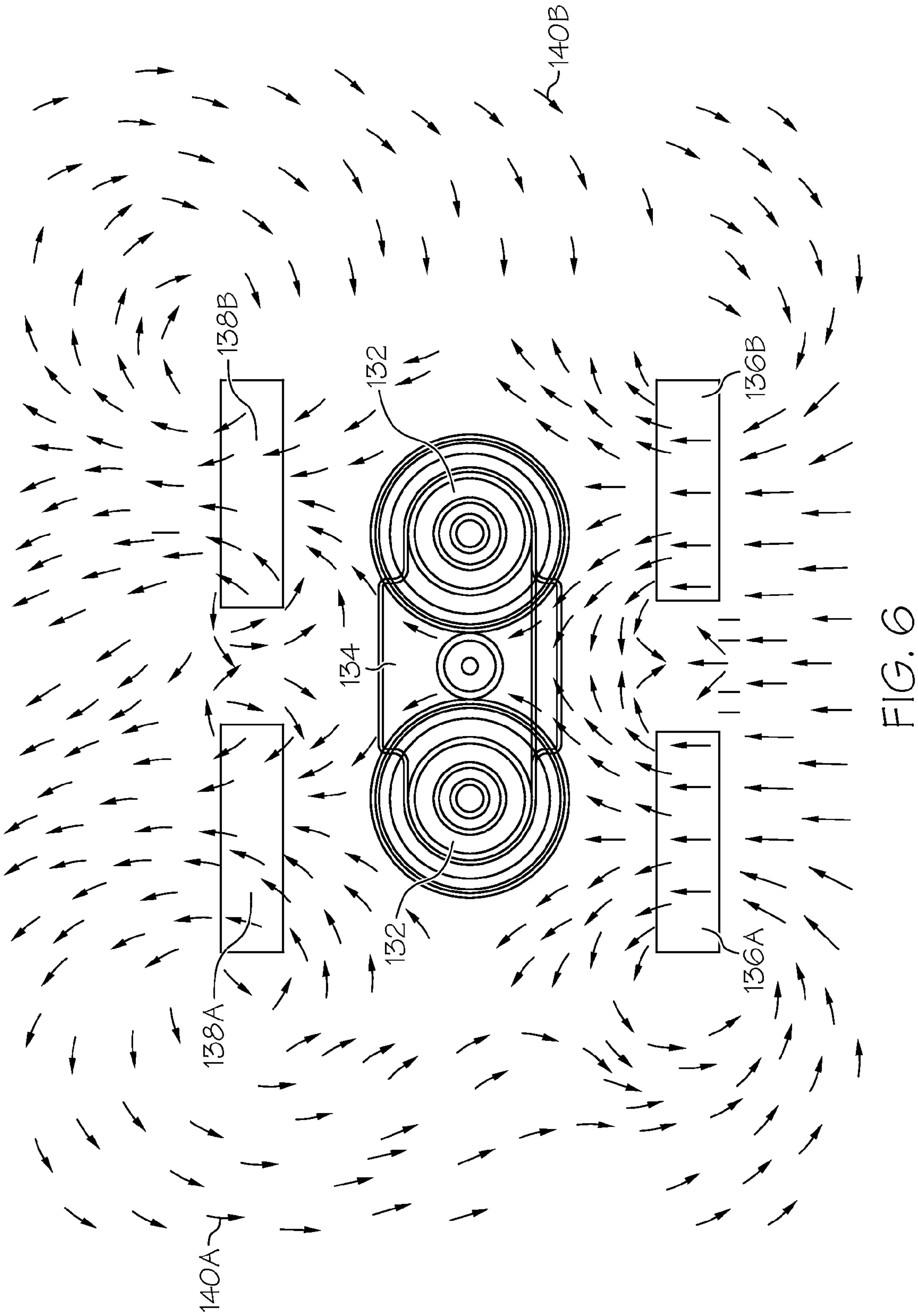
FIG. 6 shows a top view of a representative magnetic field generated by magnets disposed about the contact plate and terminal region of the relay of FIG. 5.

Referring next to FIGS. 5 and 6, the present invention allows rapid arc extinguishing while simultaneously reducing the Lorentz force by breaking up the single large bipolar field depicted in FIG. 2 into a pair of smaller bipolar fields 140A and 140B, as shown with particularity in FIG. 6. Relay 100 includes a contactor portion 130 that houses the high voltage contactor made up of terminals 132 and contact plate 134. Unlike the device shown in FIGS. 1A, 1B and 2, the magnets are formed as four smaller magnets 136A, 136B, 138A and 138B such that in the figure, the two left-most magnets 136A and 138A cooperate to form one magnetic field 140A while the two right-most magnets 136B and 138B cooperate to form a second magnetic field 140B. This allows a specific arrangement of N-S and N-S with the same poles located on the same side of the contact plate 134; and by such construction, the high voltage contactor portion 130 made up of terminals 132 and contact plate 134 exhibits dual bipolar magnetic field attributes. As shown with particularity in FIG. 5, the placement of the magnets 136A, 136B, 138A and 138B about the contact plate 134 is such that the magnets 136A, 136B, 138A and 138B are secured by frame 139 to form a rectangular pattern in general, and a four-square pattern in particular. It will be appreciated by those skilled in the art that other magnet patterns that result in a lessening of the Lorentz force imparted to the contact plate 134 in a manner similar to that shown and described are within the scope of this invention.

Importantly, the effect is that the separation of the fields 140A and 140B shifts the concentrations of the magnetic density toward the outer periphery of the contactor portion 130, leaving the magnetic density significantly decreased in and around the contact plate 134. As shown, there are two terminals 132 made up of a first terminal and a second terminal such that upon contact of the these terminals with contact plate 134 that bridges the gap between them, an electric circuit (not shown) connected to the terminals 132 can be completed. As is also shown, the contact plate 134 defines a generally rectangular structure that extends in an elongate direction between the first and second terminals such that a first portion of the contact plate can contact with the first terminal while a second portion of the contact plate can contact the second terminal. The replacement of the single bipolar magnetic field 40 of FIG. 2 with the dual bipolar magnetic field 140A and 140B made possible with the smaller, separated magnet groups 136A, 138A and 136B, 138B is further shown. As stated above, an advantage of this dual bipolar design is that the weakened magnetic field in the area around the middle of the contact plate 134 greatly reduces the downward effect of the Lorentz force (as indicated by the direction of arrow F in the accompanying orthogonal axes in FIG. 5) on the contact plate 134. This in turn allows the field formed by the magnets 136A, 136B, 138A and 138B that straddle the contact plate 134 to perform its arc-extinguishing function in a manner generally similar to that of the conventional device of FIGS. 1A, 1B and 2 while additionally providing an enhanced ability to withstand premature separation and related short-circuits created in the opening formed between the r contact plate 134 and terminals 132 relative to the contact plate 34 and terminals 32 of the conventional device of FIGS. 1A, 1B and 2.

While certain representative embodiments and details have been shown for purposes of illustrating the invention, it will be apparent to those skilled in the art that various changes may be made without departing from the scope of the invention, which is defined in the appended claims.

What is claimed is:

1. A switching assembly comprising:

a solenoid comprising at least a coil and a plunger movably responsive to electric current flowing through said coil;

a contact plate;

a plurality of electrically-conductive terminals cooperative with said solenoid and said contact plate such that upon said solenoid being energized, said plunger forces said contact plate into contact with said plurality of terminals to complete an electric circuit therebetween; and a plurality of arc-extinguishing magnets disposed about a region defined at least in part by said contact between said contact plate and said plurality of terminals such that a portion of a field created by said plurality of magnets impinges predominantly on a first portion of said contact plate while another portion of said field impinges predominantly on a second portion of said contact plate that is spaced away from said first portion such that said portions of said field impart a lower Lorentz force onto said contact plate than if an entirety of said contact plate were exposed to said field.

2. The assembly of claim 1, wherein said plurality of magnets are arranged as at least two sets such that said portion of said field that impinges predominantly on said first portion is generated by a first set while said portion of said field that impinges predominantly on said second portion is generated by a second set.

3. The assembly of claim 2, wherein said field extends substantially orthogonal to a direction of movement of said plunger such that said portion of said field that is generated by said first set of said at least two sets of magnets extends on one lateral side of said plunger while said portion of said field that is generated by said second set of said at least two sets of magnets extends on a substantially opposing lateral side of said plunger.

4. The assembly of claim 2, wherein said at least two sets of magnets are arranged in a four-square pattern such that a portion of said field that is generated by a first magnet set extends to cover less that one half of said contact plate closest to a first of said plurality of terminals while a portion of said field that is generated by a second magnet set extends to cover less that one half of said contact plate closest to a second of said plurality of terminals.

5. The assembly of claim 1, wherein said plurality of terminals comprise a first terminal and a second terminal and said contact plate extends in an elongate direction between said first and second terminals such that said first portion of said contact plate is in selective contact with said first terminal while a second portion of said contact plate is in selective contact with said second terminal.

6. The assembly of claim 1, wherein said Lorentz force imparted onto said contact plate operates along a direction substantially parallel to a direction of movement of said plunger.

7. The assembly of claim 1, wherein said contact plate is formed into an elongate shape such that said first portion does not overlap said second portion.

8. A vehicular propulsion system comprising:

a plurality of batteries;

a motive force; and a switching assembly configured to permit selective delivery of an electric current from said plurality of batteries to said motive force, said switching assembly comprising:

a solenoid comprising at least a coil and a plunger movably responsive to electric current flowing through said coil;

a contact plate;

a plurality of terminals configured to transmit electric current therethrough, said plurality of terminals cooperative with said solenoid and said contact plate such that upon said solenoid being energized, said plunger forces said contact plate into contact with said plurality of terminals to complete an electric circuit therebetween; and a plurality of arc-extinguishing magnets disposed about a region defined at least in part by said contact between said contact plate and said plurality of terminals such that a portion of a field created by said plurality of magnets impinges predominantly on a first portion of said contact plate while another portion of said field impinges predominantly on a second portion of said contact plate that is spaced away from said first portion such that said portions of said field impart a lower Lorentz force onto said contact plate than if an entirety of said contact plate were exposed to said field.

9. The propulsion system of claim 8, wherein said plurality of batteries comprise a plurality of lithium-ion batteries.

10. The propulsion system of claim 8, wherein said motive force comprises an electric motor that is rotationally coupled to at least one vehicular wheel.

11. The propulsion system of claim 10, further comprising a vehicular transmission disposed between said electric motor and said at least one vehicular wheel in order to vary an amount of rotational power being generated by said electric motor electric motor to said at least one vehicular wheel.

12. A method of operating a switching assembly, said method comprising:

disposing a contact plate adjacent a plurality of electrically-conductive terminals such that contact points may be selectively established therebetween; and operating a solenoid such that upon said solenoid being energized, it forces said contact plate into contact with said plurality of terminals to complete an electric circuit therebetween, and upon said solenoid being de-energized, it permits said contact plate to separate from said plurality of terminals to open an electric circuit therebetween, said switching assembly comprising a plurality of arc-extinguishing magnets disposed about a region defined at least in part by said contact points such that a portion of a field created by said plurality of magnets impinges predominantly on a first portion of said contact plate while another portion of said field impinges predominantly on a second portion of said contact plate that is spaced away from said first portion such that said portions of said field impart a lower Lorentz force onto said contact plate than if an entirety of said contact plate were exposed to said field.

13. The method of claim 12, wherein said switching assembly comprises an automotive relay.

14. The method of claim 13, wherein said electric circuit forms a portion of a power circuit that comprises a plurality of electric batteries and wiring configured to convey electric current from said plurality of electric batteries to a motive force through said relay.

15. The method of claim 14, wherein said motive force comprises an electric motor that is rotationally coupled to at least one vehicular wheel.

16. The method of claim 15, wherein said plurality of batteries comprise a plurality of lithium-ion batteries.

* * * * *